(12) United States Patent
Claessens et al.

(10) Patent No.: US 11,506,853 B2
(45) Date of Patent: Nov. 22, 2022

(54) CABLE MANAGEMENT SYSTEM FOR FIBER OPTIC TRAYS

(71) Applicant: COMMSCOPE TECHNOLOGIES LLC, Hickory, NC (US)

(72) Inventors: Bart Mattie Claessens, Hasselt (BE); William Alan Carrico, Raleigh, NC (US)

(73) Assignee: Commscope Technologies LLC, Hickory, NC (US)

( * ) Notice: Subject to any disclaimer, the term of this patent is extended or adjusted under 35 U.S.C. 154(b) by 0 days.

(21) Appl. No.: 17/259,120

(22) PCT Filed: Jul. 9, 2019

(86) PCT No.: PCT/US2019/040969
§ 371 (c)(1),
(2) Date: Jan. 8, 2021

(87) PCT Pub. No.: WO2020/014204
PCT Pub. Date: Jan. 16, 2020

(65) Prior Publication Data
US 2021/0157078 A1    May 27, 2021

Related U.S. Application Data

(60) Provisional application No. 62/695,559, filed on Jul. 9, 2018.

(51) Int. Cl.
*G02B 6/44*    (2006.01)

(52) U.S. Cl.
CPC ......... *G02B 6/4442* (2013.01); *G02B 6/4446* (2013.01); *G02B 6/4455* (2013.01)

(58) Field of Classification Search
CPC .................................................. G02B 6/4455
See application file for complete search history.

(56) References Cited

U.S. PATENT DOCUMENTS 5,323,480 A * 6/1994 Mullaney ............. G02B 6/4442
385/134
5,751,882 A * 5/1998 Daems ................. G02B 6/4455
385/135

(Continued)

FOREIGN PATENT DOCUMENTS

| CN | 203232184 U | 10/2013 | |
| KR | 200380996 Y1 * | 4/2005 | ........... G02B 6/4392 |

(Continued)

OTHER PUBLICATIONS

International Search Report and Written Opinion of the International Searching Authority for International Patent Application No. PCT/US2019/040969 dated Oct. 30, 2019, 10 pages.

*Primary Examiner* — Charlie Y Peng
(74) *Attorney, Agent, or Firm* — Merchant & Gould P.C.

(57) ABSTRACT

A cable management system includes a support having a stem and an arm that extends from the stem. The arm includes a channel having a plurality of openings. A locking sled is slidable from a locked position to an unlocked position within the channel. The locking sled has a plurality of locking grooves that align with the plurality of openings. Fiber optic trays are mounted to the arm, and each fiber optic tray has at least one hinge inserted through an opening on the arm and a locking groove on the locking sled. The fiber optic trays are pivotable with respect to the arm when the hinges are in the unlocked portion, and the fiber optic trays are fixed with respect to the arm when the hinges are in the locked portion.

16 Claims, 15 Drawing Sheets

(56) References Cited

U.S. PATENT DOCUMENTS

| | | | | |
|---|---|---|---|---|
| 6,275,641 B1* | 8/2001 | Daoud | ................ | G02B 6/4455 |
| | | | | 385/134 |
| 2007/0058918 A1 | 3/2007 | Trebesch et al. | | |
| 2013/0105420 A1* | 5/2013 | Ray | ...................... | G02B 6/4454 |
| | | | | 29/559 |
| 2017/0235076 A1* | 8/2017 | Solheid | ................ | G02B 6/4455 |
| | | | | 385/135 |
| 2017/0363831 A1 | 12/2017 | Cornelissen et al. | | |

FOREIGN PATENT DOCUMENTS

| | | |
|---|---|---|
| WO | 2013/149667 A1 | 10/2013 |
| WO | 2015/158687 A1 | 10/2015 |

\* cited by examiner ized as hexagon, and each fiber optic tray is pivotable with respect to the arm by 60 degrees, by 120 degrees, or by 180 degrees. In other examples, the polygon shape is a square, and each fiber optic tray is pivotable with respect to the arm by 90 degrees or by 180 degrees. In some examples, the arm extends from the stem at about 30 degrees to about 60 degrees.
CABLE MANAGEMENT SYSTEM FOR FIBER OPTIC TRAYS

CROSS-REFERENCE TO RELATED APPLICATION

This application is a National Stage Application of PCT/US2019/040969, filed on Jul. 9, 2019, which claims the benefit of U.S. Patent Application Ser. No. 62/695,559, filed on Jul. 9, 2018, the disclosures of which are incorporated herein by reference in their entireties. To the extent appropriate, a claim of priority is made to each of the above disclosed applications.

TECHNICAL FIELD

The present disclosure relates to the management of optical fiber connections, and in particular, to a cable management system for fiber optic trays.

BACKGROUND

Fiber optic cables are often managed by a cable management system housed inside a telecommunications closure. The cable management system typically includes a plurality of pivotally mounted trays mounted on a support. A cable with an optical fiber can be fixed to the support so that the optical fiber from the cable can be guided to a tray that has an arrangement for fixing fiber optic splices. The tray can include various cable and fiber guides, and various guide walls and retaining tabs for guiding incoming and outgoing cables and fibers to and from the telecommunications closure.

There is a need from time to time to access an individual tray to add or remove a fiber, or to make adjustments to a fiber on the tray. Therefore, improvements are needed to pivot and hold the trays in an accessible position in the cable management system.

SUMMARY

The present disclosure relates generally to a cable management system that can hold fiber optic trays. In one possible configuration and by non-limiting example, the cable management system includes a locking sled that allows the fiber optic trays to pivot so that at least one fiber optic tray is accessible.

In one aspect, the disclosed technology relates to a cable management system comprising a support having a stem and an arm extending from the stem. The arm has a channel with a plurality of openings on opposite sides of the channel. A locking sled is slidable from a locked position to an unlocked position within the channel, and has a plurality of locking grooves that align with the plurality of openings. Each locking groove has a locked portion and an unlocked portion. A plurality of fiber optic trays are mounted to the arm. Each fiber optic tray having at least one hinge inserted through an opening on the arm and inserted through a locking groove on the locking sled. The fiber optic trays are pivotable with respect to the arm when the hinges are in the unlocked portion, and the fiber optic trays are fixed with respect to the arm when the hinges are in the locked portion. A single movement of the locking sled from the locked position to the unlocked position can concurrently pivot a plurality of fiber optic trays simultaneously. In some examples, a telecommunications closure can comprise the cable management system.

In some examples, the locked portion of each locking groove has a polygon shape, and the unlocked portion of each locking groove has an elliptical shape. In some examples, the locked portion of each locking groove has a polygon shape, and the hinge of each fiber optic tray has a corresponding polygon shape.

In some examples, the polygon shape is a hexagon, and each fiber optic tray is pivotable with respect to the arm by 60 degrees, by 120 degrees, or by 180 degrees. In other examples, the polygon shape is a square, and each fiber optic tray is pivotable with respect to the arm by 90 degrees or by 180 degrees. In some examples, the arm extends from the stem at about 30 degrees to about 60 degrees.

In another aspect, the disclosed technology relates to a fiber optic tray for use in a cable management system. The fiber optic tray comprises a tray body defining a fiber storage region, and fiber management tabs around the fiber storage region. The fiber management tabs are configured to retain excess optical fiber in the fiber storage region. A tab extends outwardly from the tray body, and a hinge protrudes from the tab. The hinge has a polygon shape, and allows the fiber optic tray to pivot with respect to the cable management system when the hinge is in an unlocked portion in the cable management system, and the hinge prevents the fiber optic tray from pivoting with respect to the cable management system when the hinge is in a locked portion in the cable management system. In some examples, a cable management system for a telecommunications closure comprises the fiber optic tray.

In some examples, the polygon shape is a square, and the fiber optic tray is pivotable with respect to the cable management system by about 90 degrees. In other examples, the polygon shape is a hexagon, and the fiber optic tray is pivotable with respect to the cable management system by about 60 degrees.

In another aspect, the disclosed technology relates to a locking sled for use in a cable management system. The locking sled comprises a body configured to slide within the cable management system, the body having at least a first sliding surface and a second sliding surface, the first sliding surface and the second sliding surface being parallel with one another. A first set of locking grooves are on the first sliding surface, and a corresponding second set of locking grooves are on the second sliding surface, each locking groove having a locked portion and an unlocked portion. The locked portion prevents a fiber optic tray from pivoting with respect to the cable management system, and the unlocked portion allows the fiber optic tray to pivot with respect to the cable management system. In some examples, a cable management system for a telecommunications closure comprises the locking sled.

The locked portion has a polygon shape, and the unlocked portion has an elliptical shape. In certain examples, the locked portion has a hexagon shape, and the locking grooves allow fiber optic trays to pivot with respect to the cable management system by 60 degrees, by 120 degrees, or by 180 degrees. In other examples, the locked portion has a square shape, and the locking grooves allow fiber optic trays to pivot with respect to the cable management system by 90 degrees or by 180 degrees.

In another aspect, the disclosed technology relates to a method of operating a cable management system, the method comprising: providing a cable management system having a locking sled; enabling the locking sled to slide from a locked position to an unlocked position within the cable management system; allowing at least one fiber optic tray to pivot with respect to the cable management system for providing access to a previously inaccessible fiber optic tray when the locking sled is in the unlocked position; and enabling the locking sled to slide from the unlocked position to the locked position, when the locking sled is in the locked position, preventing the at least one fiber optic tray to pivot with respect to the cable management system.

In some examples, the method further comprises enabling the addition or removal of an optical fiber to the previously inaccessible fiber optic tray, or adjustments to an optical fiber on the previously inaccessible fiber optic tray when the locking sled is in the locked position. In some examples, the method further comprises enabling a single movement of the locking sled from the locked position to the unlocked position to concurrently pivot a plurality of fiber optic trays simultaneously.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
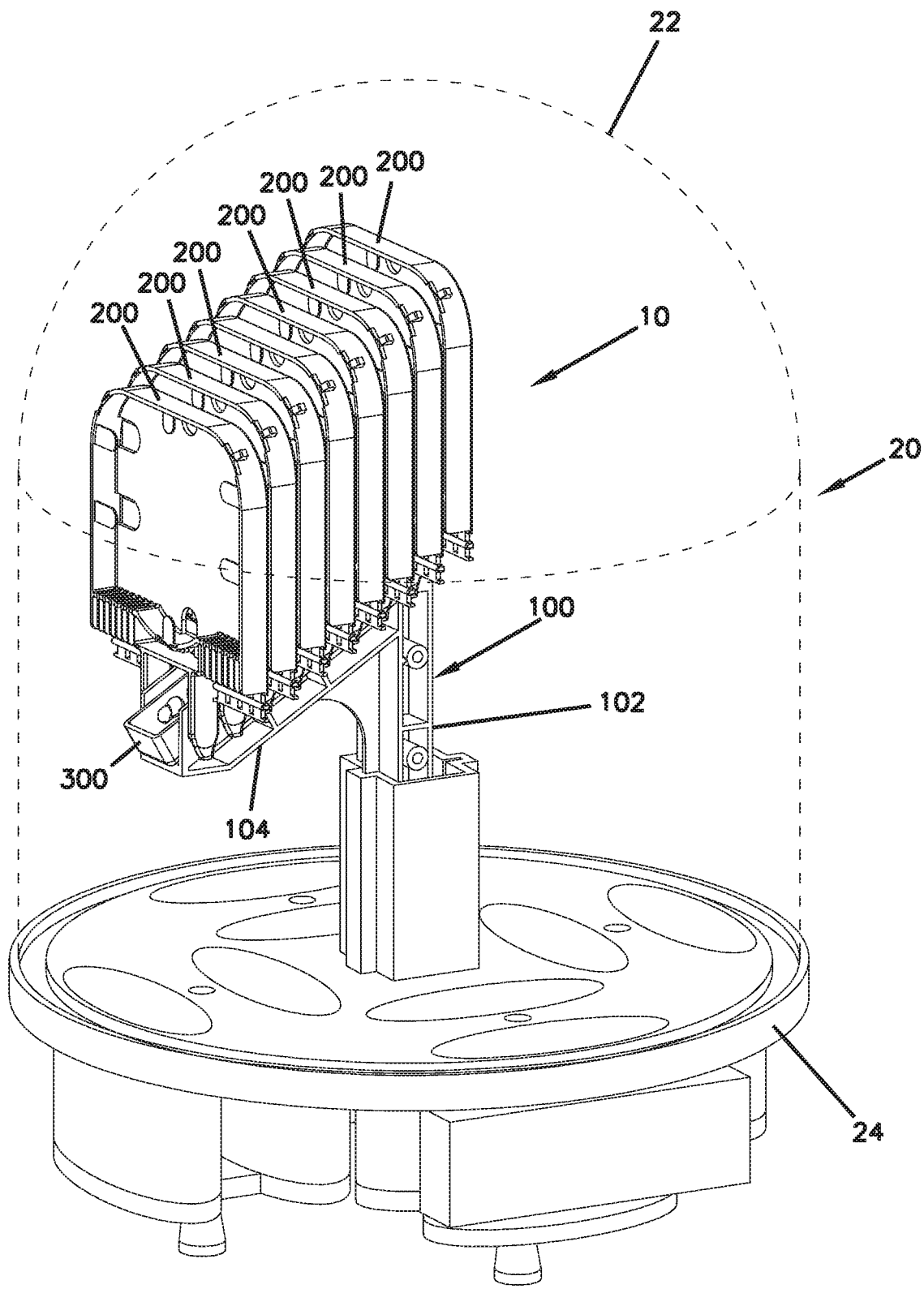
FIG. 1 is an isometric view of a cable management system housed inside a telecommunications closure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Any examples set forth in this specification are not intended to be limiting and merely set forth some of the many possible embodiments for the claimed invention.

FIG. 1 is an isometric view of a cable management system 10 housed inside a telecommunications closure 20. The telecommunications closure 20 can be part of a telecommunications network that uses fiber optic cables capable of transmitting large volumes of data and voice signals over relatively long distances.

As shown in FIG. 1, the telecommunications closure 20 includes a dome 22 (depicted in broken lines) attached to a base 24. The telecommunications closure 20 is adapted to house and protect the cable management system 10 including components such as fiber optic cables, splices, termination panels, power splitters, and wave division multiplexers. In certain applications, the telecommunications closure 20 is water and contaminant (e.g., dust) proof and/or water-resistant such that water, moisture, cleaning fluids, dust, etc. are prevented from reaching the cable management system 10 and the components housed within the interior of the telecommunications closure 20.

Figure 2:
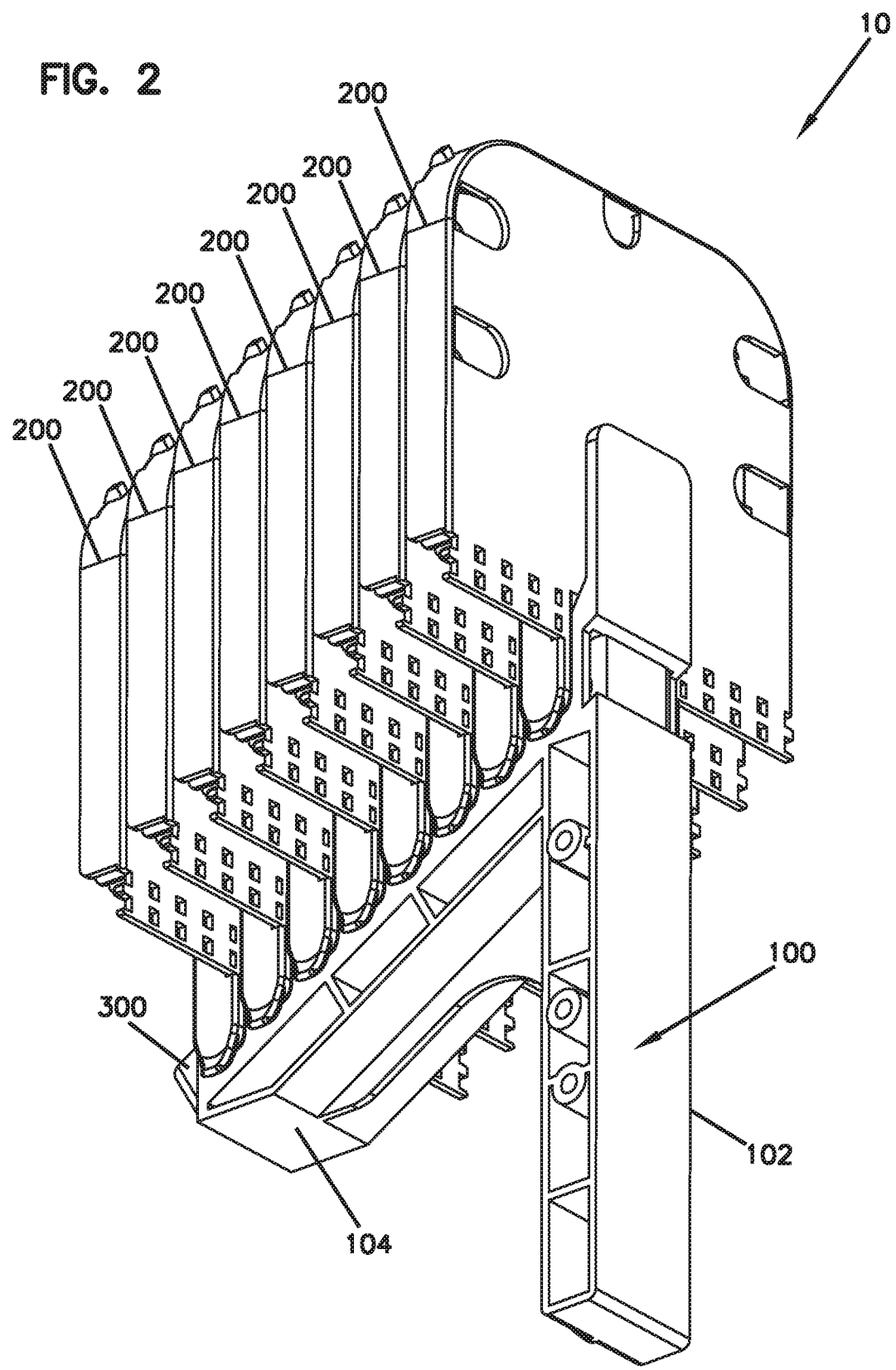
FIG. 2 is a vertical isometric view of the cable management system removed from the telecommunications closure.
Figure 3:
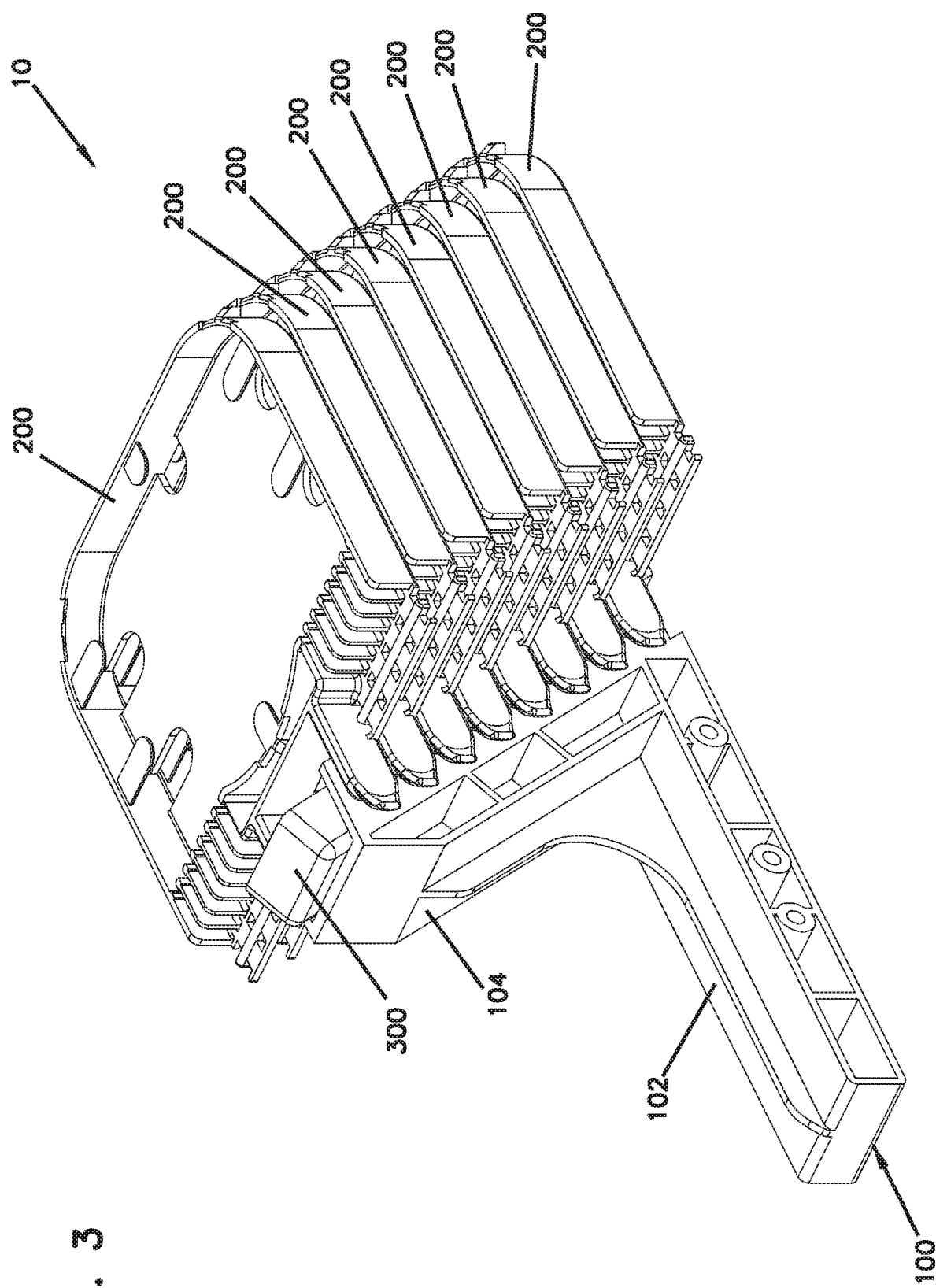
FIG. 3 is a horizontal isometric view of the cable management system removed from the telecommunications closure.

FIG. 2 is a vertical isometric view of the cable management system 10 removed from the telecommunications closure 20. FIG. 3 is a horizontal isometric view of the cable management system 10 removed from the telecommunications closure 20. As shown in FIGS. 1-3, the cable management system 10 includes a support 100. The support 100 has a stem 102 that can be held by the base 24 of the telecommunications closure 20. The support also includes an arm 104 that extends from the stem 102, and that can support a plurality of fiber optic trays 200 that are mounted to the arm 104. One or more cables (not shown) having optical fibers can be guided to the fiber optic trays 200 so that the optical fibers can be managed by the trays. The fiber optic trays 200 can be splice trays, splitter trays, wave division multiplexer trays, storage trays, or other trays. In the example illustrated in the figures, the fiber optic trays 200 are splice trays.

In the example depicted in FIGS. 1-3, the cable management system 10 includes eight fiber optic trays 200 mounted to the arm 104. It is contemplated that the number of fiber optic trays 200 may vary as needed or desired for a particular application such that the cable management system 10 can include more than eight fiber optic trays 200 or fewer than eight fiber optic trays 200.

The arm 104 houses a locking sled 300 that can be used to lock and unlock the fiber optic trays 200 mounted to the arm 104. When the fiber optic trays 200 are locked, the fiber optic trays 200 cannot move with respect to the arm 104. When the fiber optic trays 200 are unlocked, the fiber optic trays 200 are pivotable with respect to the arm 104 so that at least one fiber optic tray 200 can be accessed to add or remove a fiber to the tray, or to make adjustments to a fiber on the tray.

Figure 4:
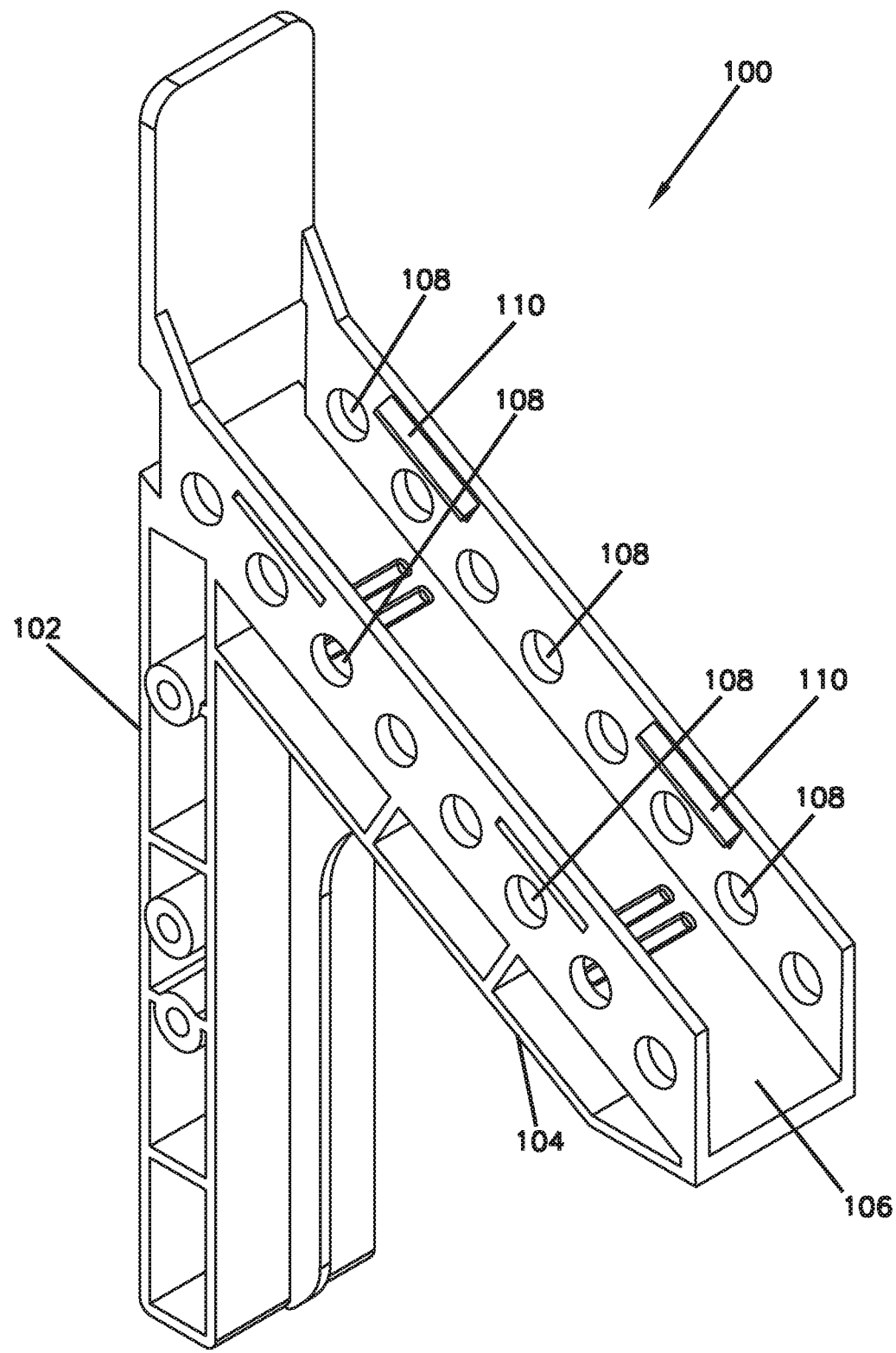
FIG. 4 is a front isometric view of a support.

FIG. 4 is a front isometric view of the support 100. As shown in FIG. 4, the arm 104 extends at an angle from the stem 102. In some examples, the arm 104 extends from the stem 102 at about 30 degrees to about 60 degrees. In some examples, the arm 104 extends from the stem 102 at about 45 degrees.

The arm 104 includes a channel 106 that has a plurality of openings 108 located on opposite sides of the channel 106. As shown in FIG. 4, the openings 108 have an ellipse shape such as the shape of a circle. In the example shown, there are eight openings 108 on each side of the channel 106 that correspond to the eight fiber optic trays 200 shown in FIGS. 1-3. It is contemplated that the number of openings 108 on either side of the channel 106 may vary as needed or desired to accommodate more than or fewer than eight fiber optic trays 200.

The arm 104 also includes one or more ridges 110 that can engage surfaces 316 (shown in FIG. 5) of the locking sled 300. The ridges 110 can help guide the locking sled 300 when the locking sled 300 slides inside the channel 106.

The support 100 is made from a rigid and sturdy material to support the weight from the fiber optic trays 200 and the cables that are mounted thereto. In some examples, the support 100 can be made from a rigid plastic material that is injection molded, or can be made from a metal such as stainless steel or aluminum.

Figure 5:
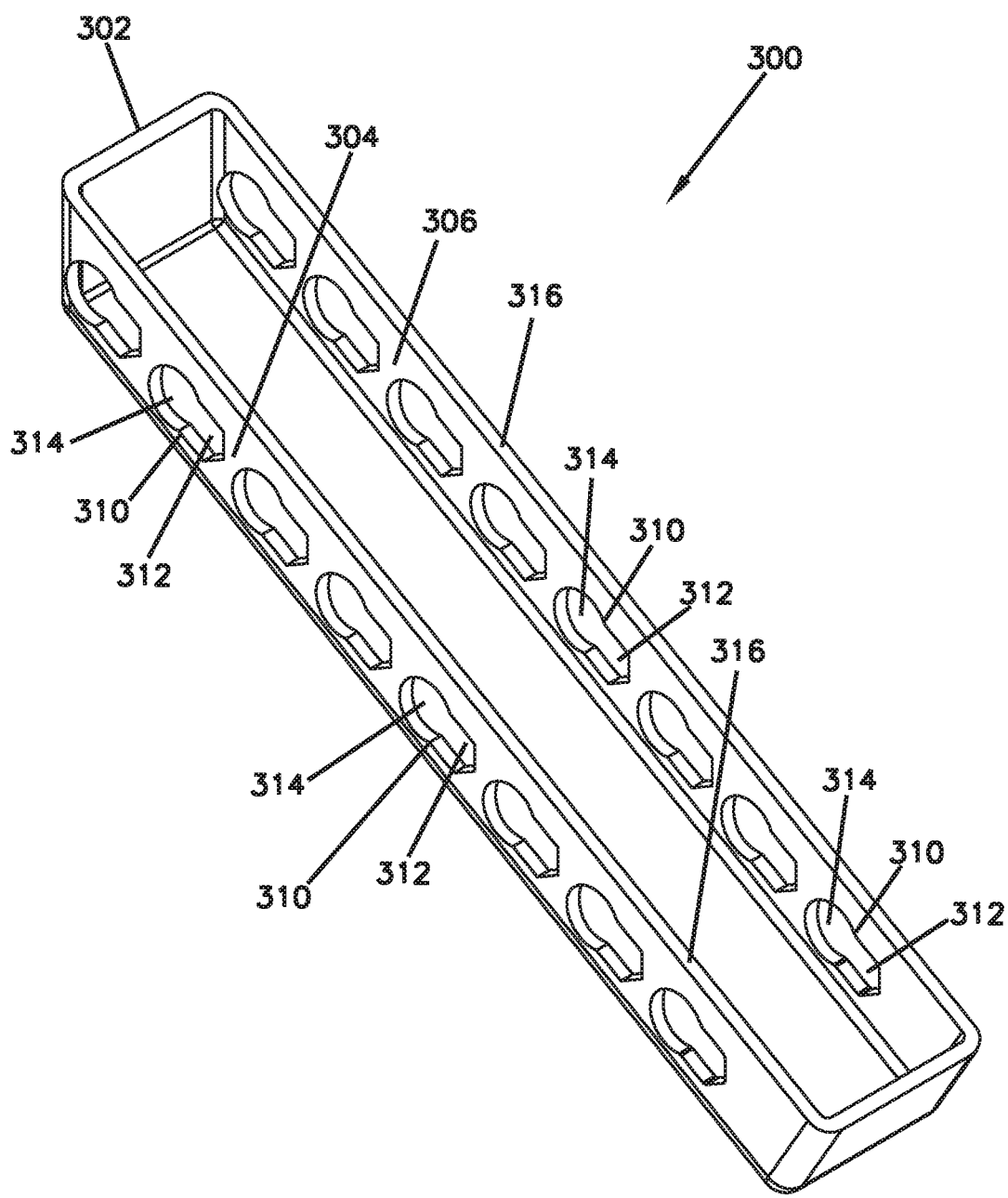
FIG. 5 is an isometric view of a locking sled.

FIG. 5 is an isometric view of the locking sled 300. The locking sled 300 includes a body 302 that is configured to slide from a locked position to an unlocked position within the channel 106 of the support 100. The body 302 includes a first sliding surface 304 and a second sliding surface 306 that are parallel with one another. As described above, the locking sled 300 also includes surfaces 316 that can engage the ridges 110 inside the channel 106 when the locking sled 300 slides therein.

The first sliding surface 304 includes a first set of locking grooves 310, and the second sliding surface 306 includes a corresponding second set of locking grooves 310. In the example shown in FIG. 5, there are eight locking grooves 310 on the first sliding surface 304 and there are eight locking grooves 310 on the second sliding surface 306. When the locking sled 300 is housed inside the channel 106, the locking grooves 310 align with the eight openings 108 on each side of the channel 106. Like the openings 108, it is contemplated that the number of locking grooves 310 may vary as needed or desired to accommodate more than or fewer than eight fiber optic trays 200.

Each locking groove 310 has a locked portion 312 and an unlocked portion 314. The locked portion 312 of each locking groove 310 prevents a fiber optic tray 200 from pivoting with respect to the arm 104 of the cable management system 10. The unlocked portion 314 of each locking groove 310 allows a fiber optic tray 200 to pivot with respect to the arm 104 of the cable management system 10.

The locked portion 312 in each locking groove 310 has a polygon shape. In the example shown in FIG. 5, the locked portion 312 in each locking groove 310 has a hexagon shape. In other examples, locked portion in each locking groove on the locking sled can have a rectangular or square shape or other polygon shape (e.g., see FIG. 9).

The unlocked portion 314 in each locking groove 310 has an ellipse shape. In the example shown in FIG. 5, the unlocked portion 314 in each locking groove 310 has a circular shape. In other examples, unlocked portion 314 can have an oval shape.

Figure 6:
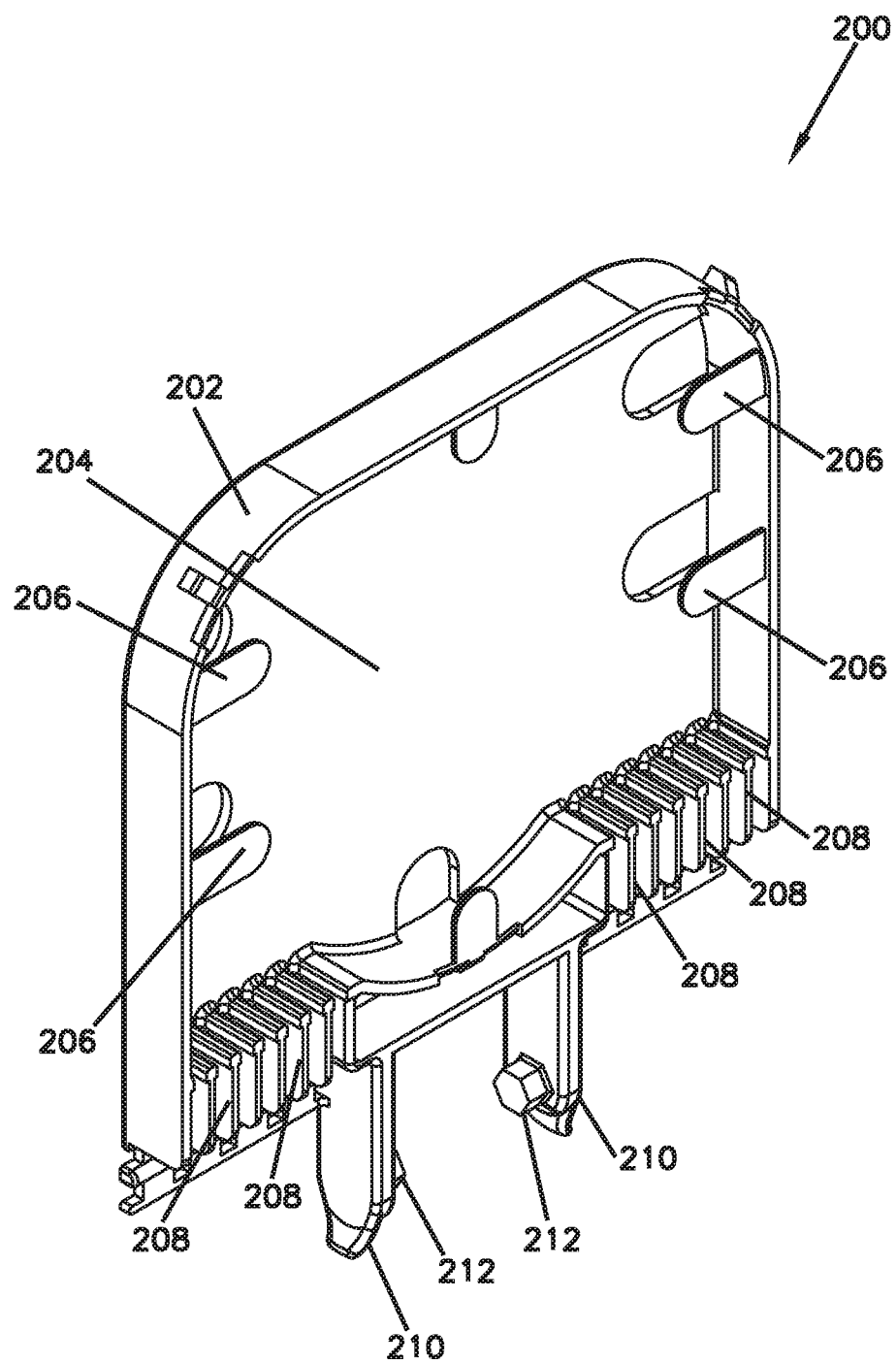
FIG. 6 is an isometric view of a fiber optic tray.

FIG. 6 is an isometric view of a fiber optic tray 200. The fiber optic tray 200 has a tray body 202 that defines a fiber storage region 204. Fiber management tabs 206 extend from the tray body 202 around the fiber storage region 204. The one or more fiber management tabs 206 can be used to retain excess optical fiber (not shown) in the fiber storage region 204. A plurality of splice mounts 208 are adjacent to the fiber storage region 204 on the tray body 202. The splice mounts 208 can be used to mount one or more optical splices (not shown) onto the tray body 202.

As shown in FIG. 6, the fiber optic tray 200 includes tabs 210 that extend outwardly from each side of the tray body 202. Each tab 210 includes a hinge 212. Each hinge 212 is insertable through an opening 108 on the arm 104 (shown in FIG. 4) and through a locking groove 310 on the locking sled 300 (shown in FIG. 5). Each hinge 212 has a polygon shape. In the examples depicted in the figures, the hinges 212 have a hexagon shape that corresponds to the hexagon shape of the locked portion 312 in each of the locking grooves 310 shown in FIG. 5. In other alternative examples, the hinges of the fiber optic trays can have a rectangular or square shape that corresponds to a locked portion having a rectangular or square shape (see FIG. 9).

Figure 7:
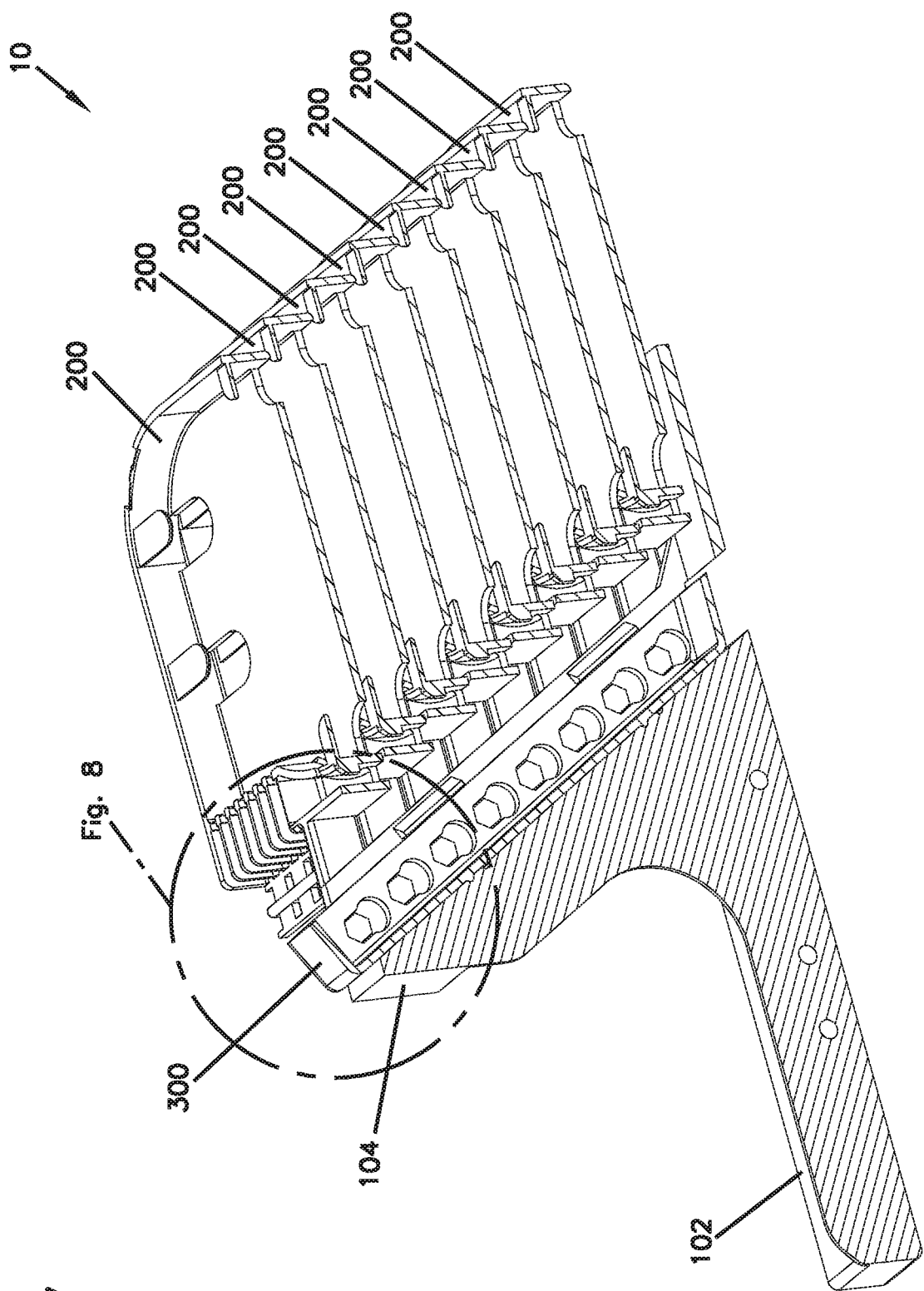
FIG. 7 is a cross-sectional isometric view of the cable management system with the locking sled and the fiber optic trays in a locked position.
Figure 8:
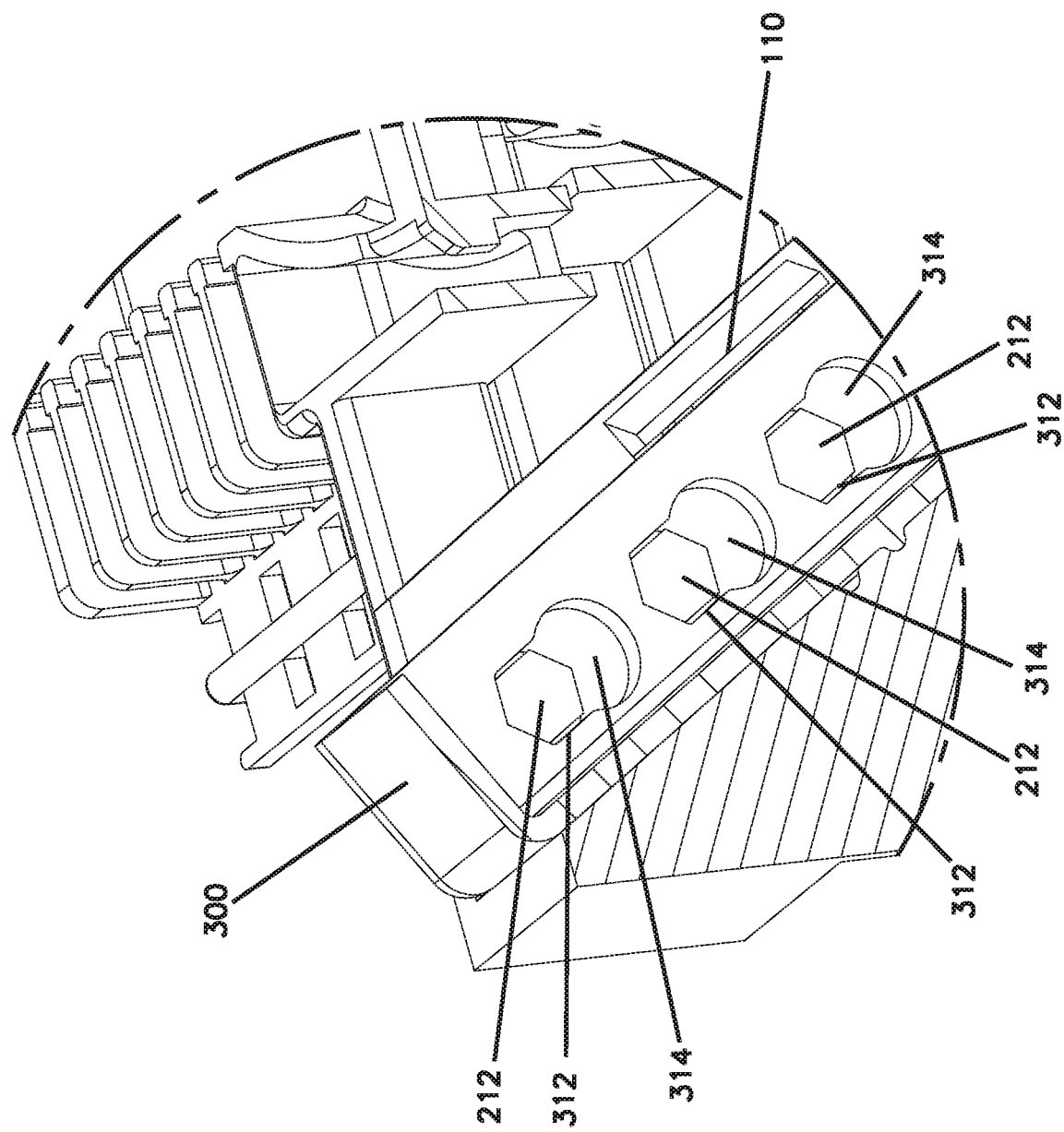
FIG. 8 is a detailed view of FIG. 7.

FIG. 7 is a cross-sectional isometric view of the cable management system 10 with the locking sled 300 in the locked position. FIG. 8 is a detailed view of FIG. 7. As shown in FIGS. 7 and 8, the hinges 212 are in the locked portion 312 in each locking groove 310 when the locking sled 300 is in the locked position. The sides of the locked portions 312 engage the sides of the hinges 212 such that the hinges 212 are unable to turn (e.g., pivot) with respect to the locked portions 312 in the locking sled 300. Thus, the fiber optic trays 200 are prevented from pivoting with respect to the cable management system 10 when the locking sled 300 is in the locked position.

Figure 9:
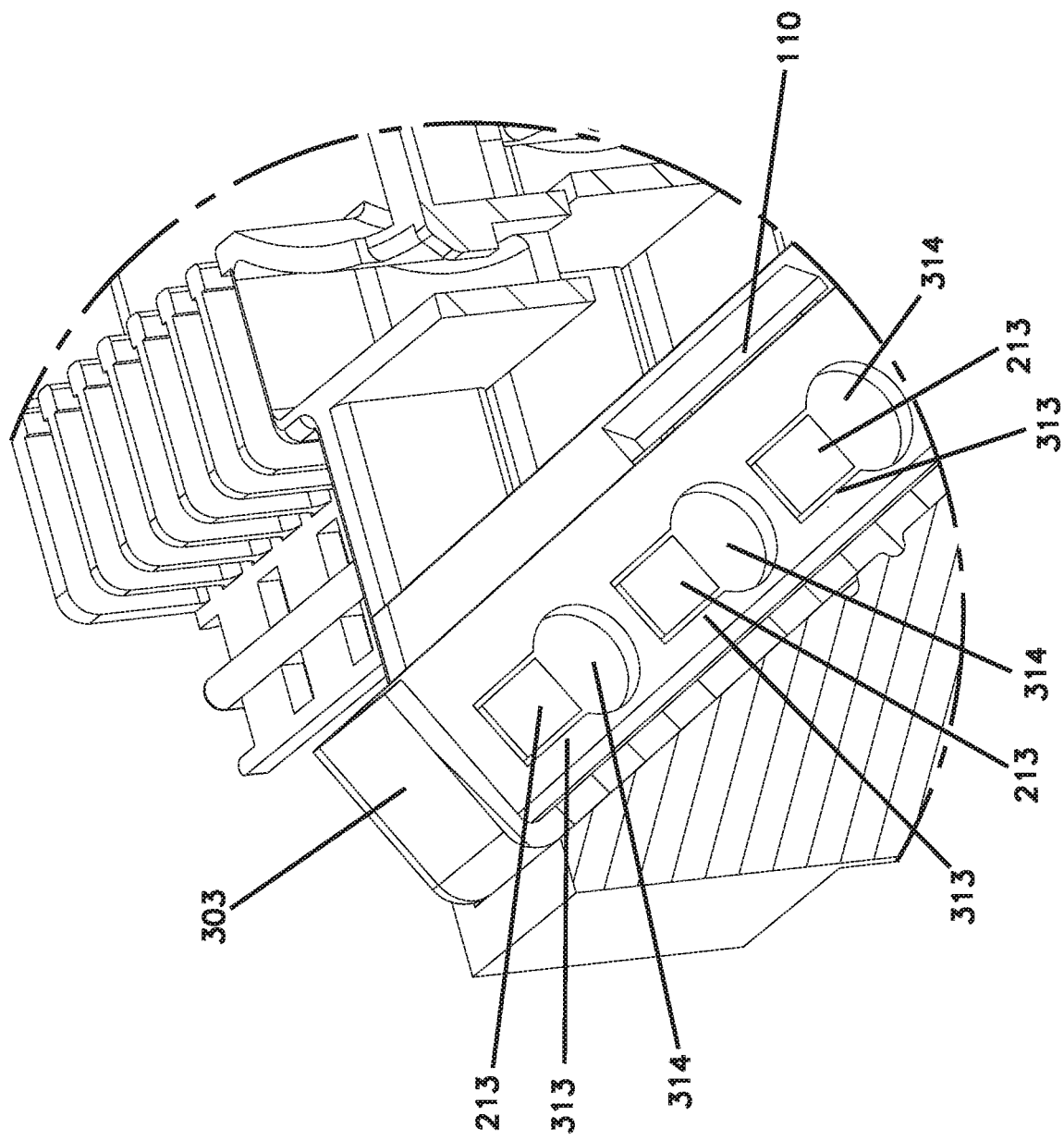
FIG. 9 is a detailed view of an alternative embodiment of the cable management system with a locking sled in a locked position.

FIG. 9 is a detailed view of an alternative embodiment of the cable management system with a locking sled 303 depicted in a locked position. The locking sled 303 includes locked portions 313 having a square shape. Similarly, each fiber optic tray includes at least one hinge 213 having a square shape. As shown in FIG. 9, the hinges 213 are in the locked portions 313 when the locking sled 303 is in the locked position. The sides of the locked portions 313 engage the sides of the hinges 213 such that the hinges 213 are unable to turn within the locked portions 313. Thus, the fiber optic trays are prevented from pivoting with respect to the cable management system when the locking sled 303 is in the locked position.

Figure 10:
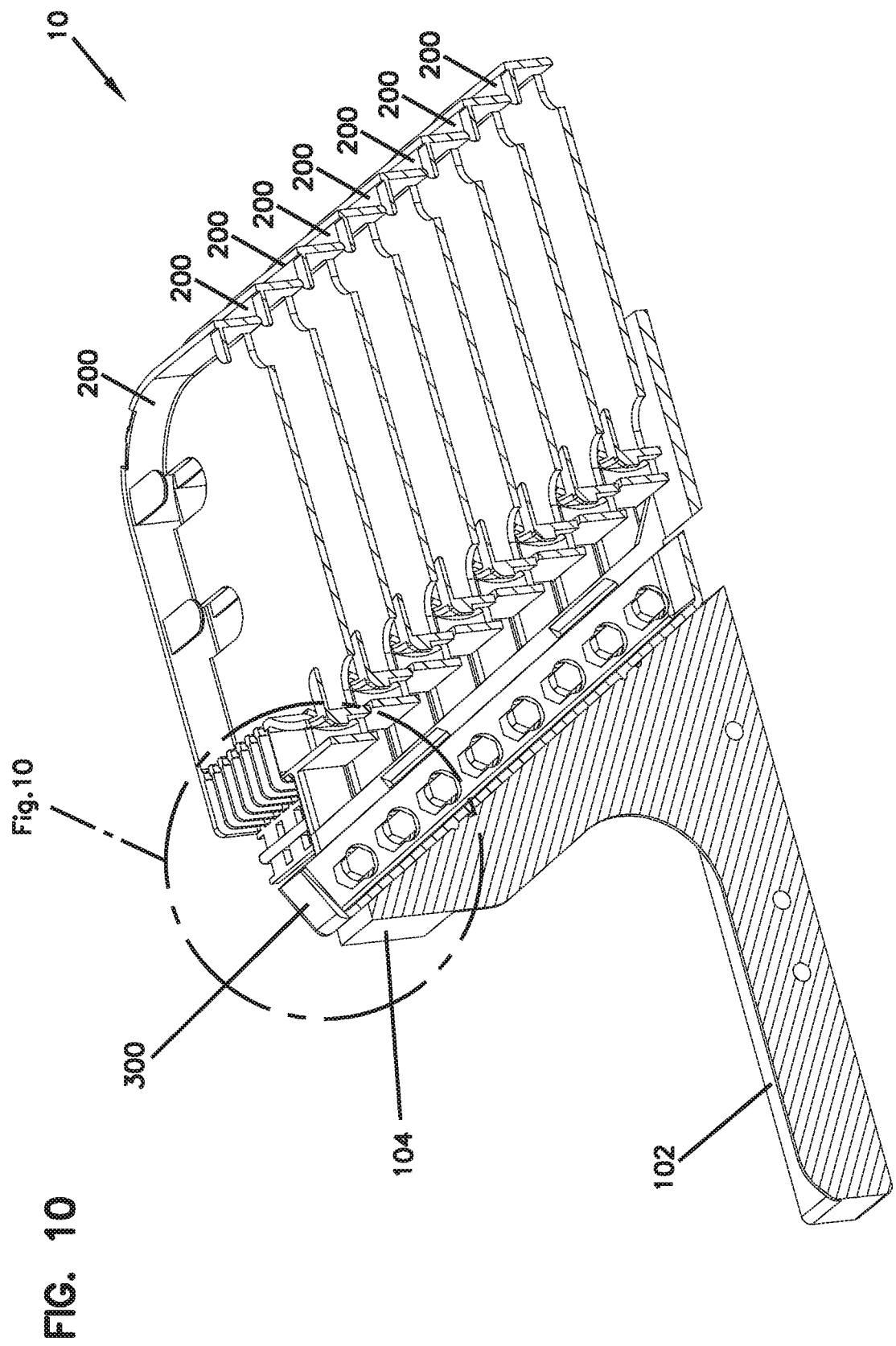
FIG. 10 is a cross-sectional isometric view of the cable management system with the locking sled and the fiber optic trays in an unlocked position.
Figure 11:
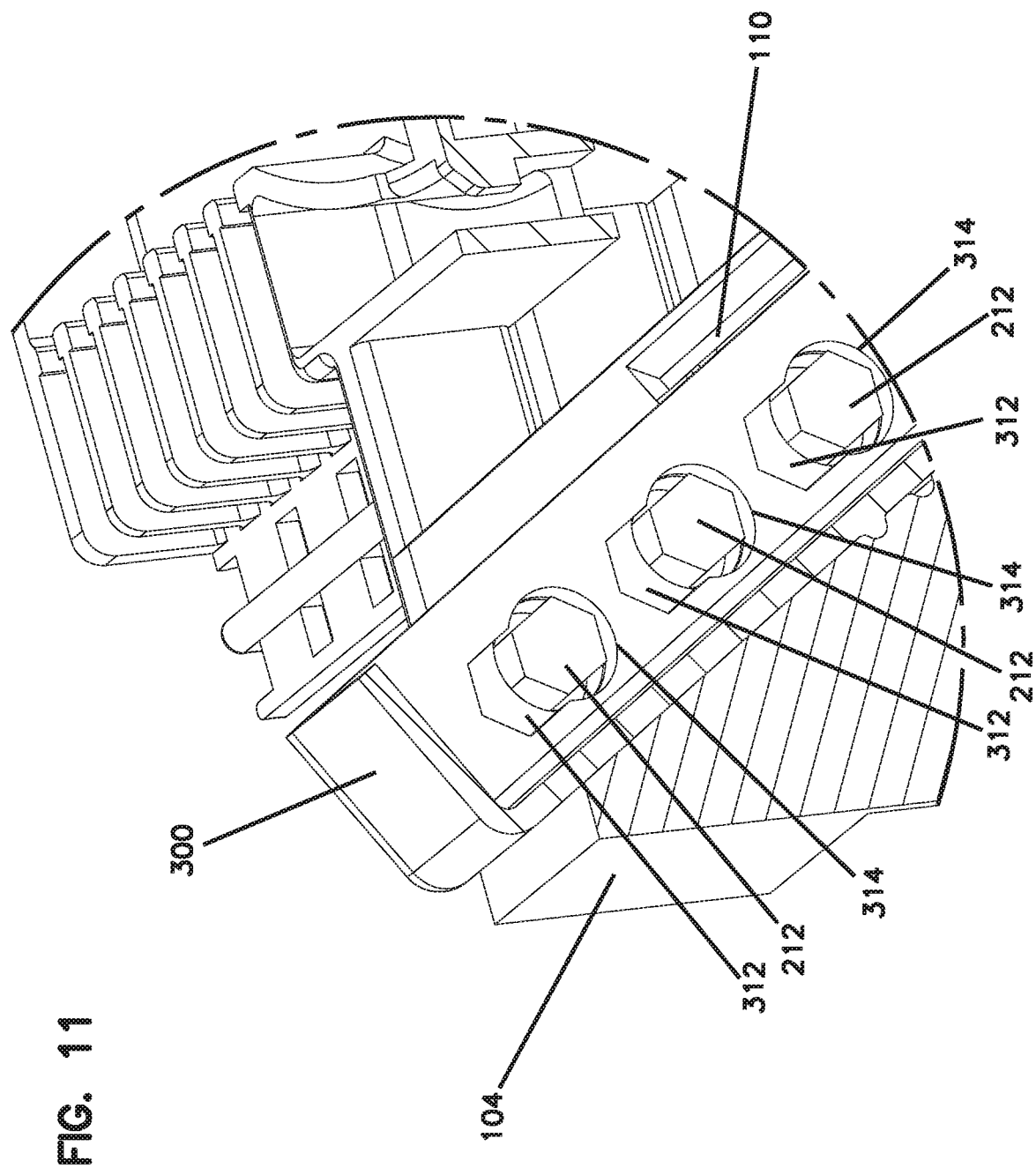
FIG. 11 is a detailed view of FIG. 10.

FIG. 10 is a cross-sectional isometric view of the cable management system 10 with the locking sled 300 in the unlocked position. FIG. 11 is a detailed view of FIG. 10. When the locking sled 300 slides from the locked position to the unlocked position in the channel 106 of the arm 104, each locking groove 310 slides relative to each hinge 212 such that each hinge 212 is located inside the unlocked portion 314 in each locking groove 310. When the hinges 212 are in the unlocked portion 314, the fiber optic trays 200 are pivotable with respect to the cable management system 10 due to the elliptical shape (e.g., circular shape) of the unlocked portion 314 which allows the hinges 212 to turn inside the locking grooves 310 in the locking sled 300.

Figure 12:
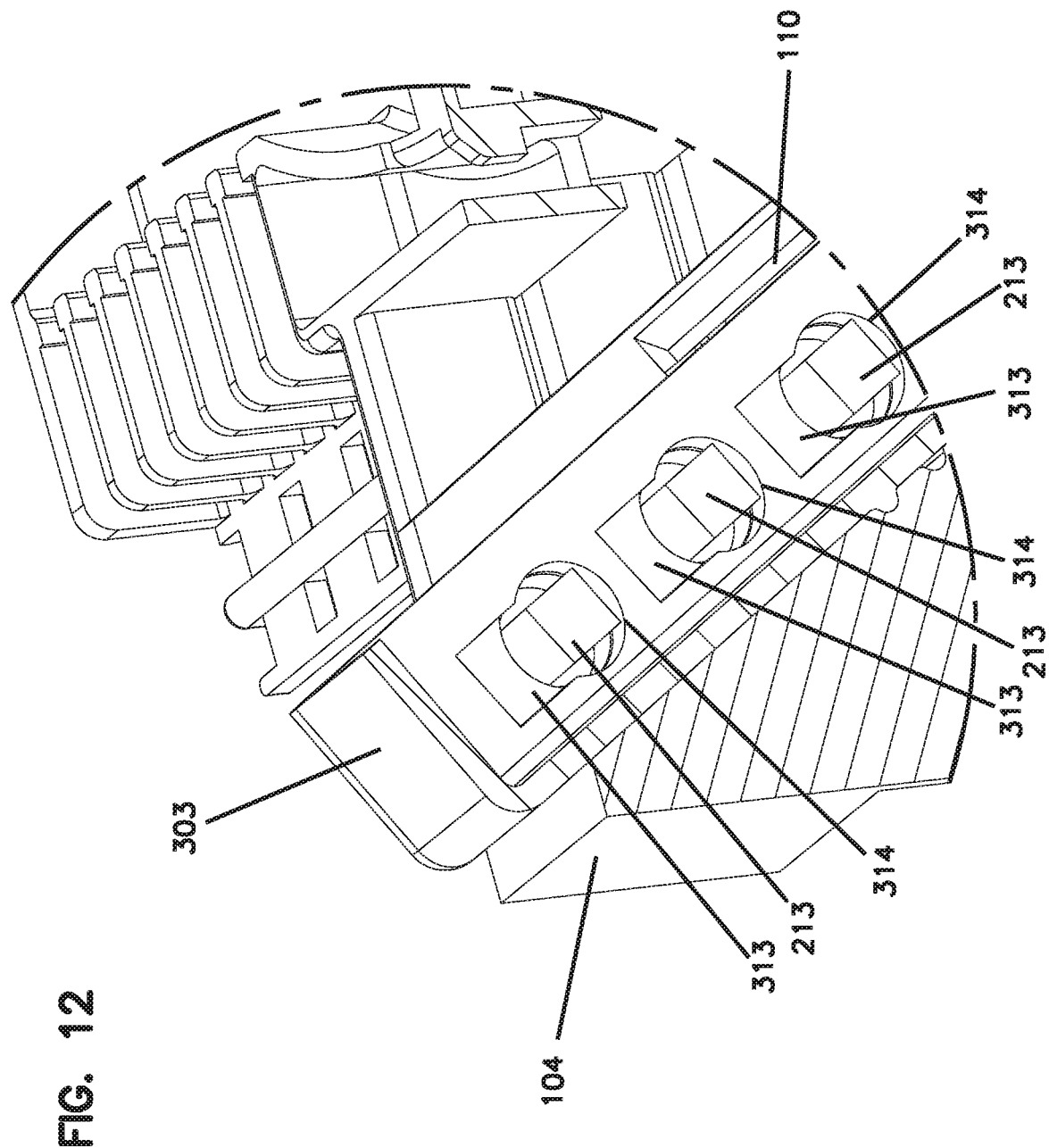
FIG. 12 is a detailed view of the alternative embodiment of the cable management system with a locking sled in an unlocked position

FIG. 12 is a detailed view of the alternative embodiment of the cable management system with the locking sled 303 in an unlocked position. As shown in FIG. 12, the locking sled 303 includes locked portions 313 having a square shape and the hinges 213 of each fiber optic tray have a square shape. When the locking sled 303 slides from the locked position to the unlocked position, each locking groove slides relative to each hinge 213 such that each hinge 213 is located inside the unlocked portion 314 in each locking groove. When the hinges 213 are in the unlocked portion 314, the fiber optic trays are pivotable with respect to the cable management system due to the elliptical shape (e.g., circular shape) of the unlocked portion 314 which allows the hinges 213 to turn inside the locking grooves in the locking sled 303.

Figure 13:
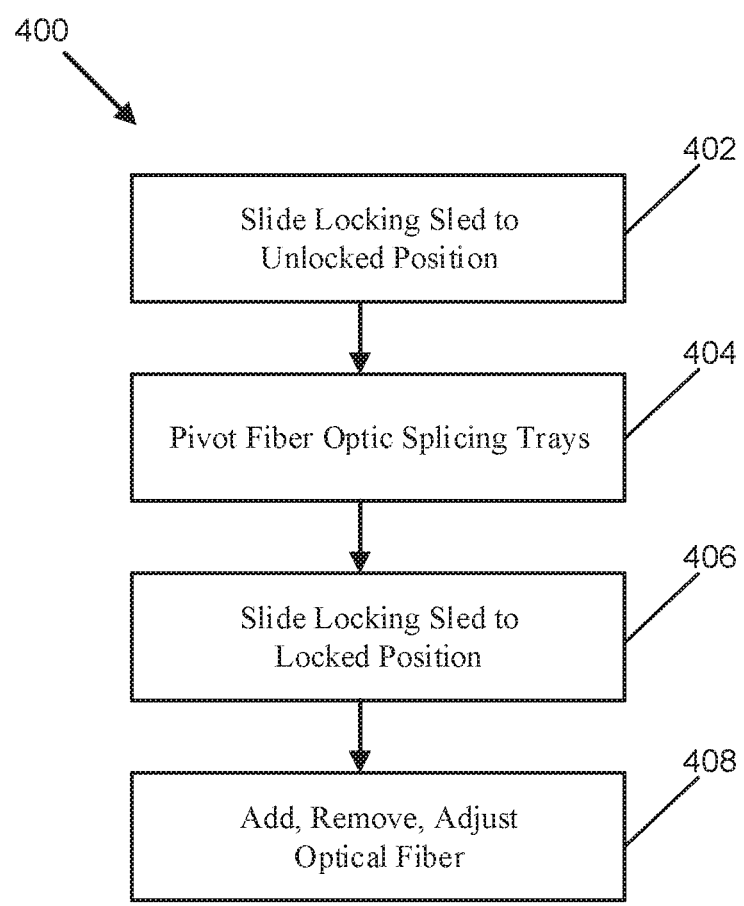
FIG. 13 illustrates a method of operating a cable management system.

FIG. 13 illustrates a method 400 of operating the cable management system 10. The method 400 includes a step 402 of sliding the locking sled 300 from the locked position to the unlocked position in the channel 106 of the support 100. When the locking sled 300 is in the locked position, the fiber optic trays 200 are held in a fixed position with respect to the arm 104 of the cable management system 10. When the locking sled 300 is in the unlocked position, the fiber optic trays 200 are pivotable with respect to the arm 104 of the cable management system 10.

Figure 14:
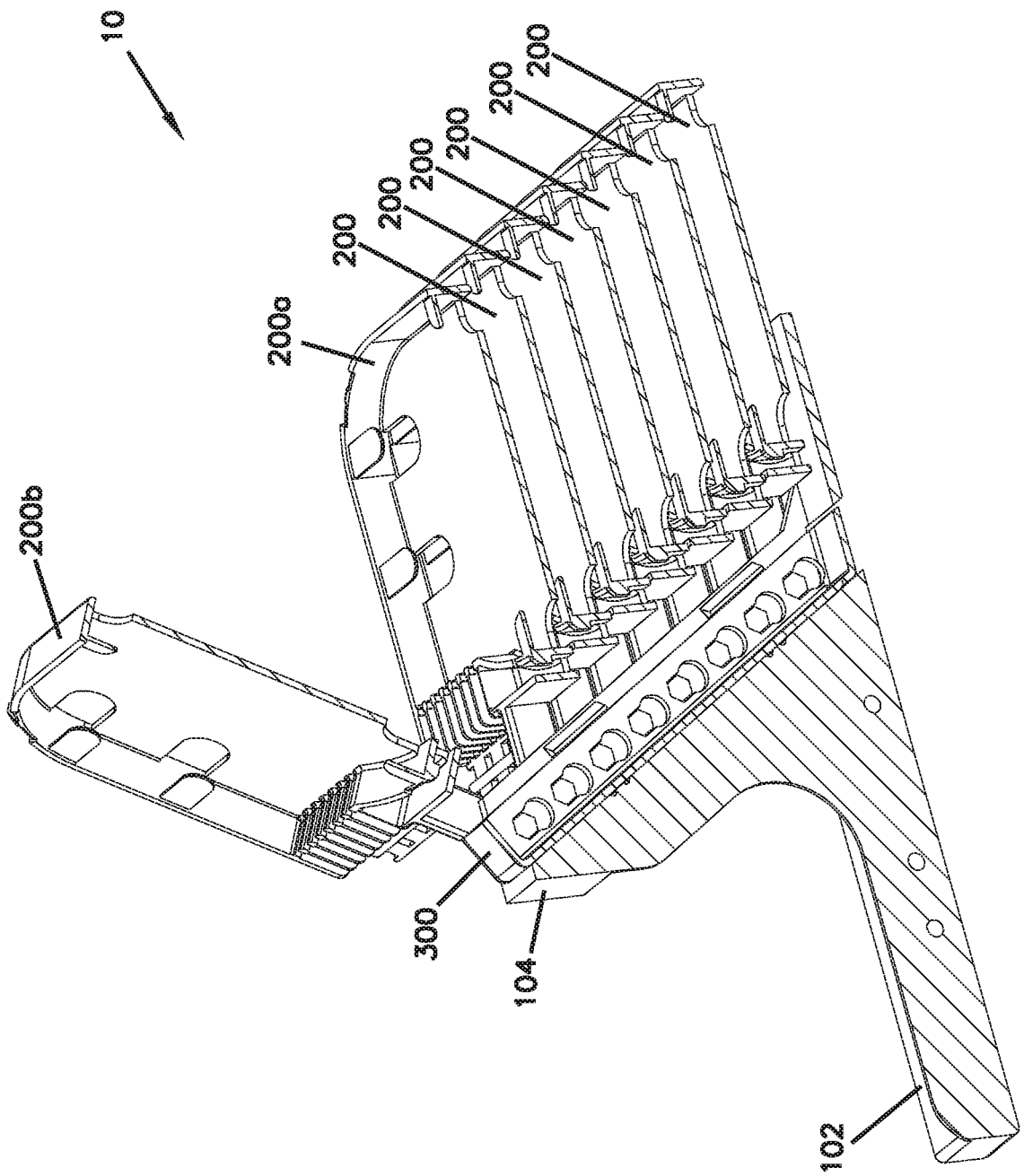
FIG. 14 is a cross-sectional isometric view of the cable management system showing a previously inaccessible fiber optic tray in an accessible position.

Next, the method 400 includes a step 404 of pivoting at least one fiber optic tray (e.g., fiber optic tray 200b shown in FIG. 14) to access a previously inaccessible fiber optic tray (e.g., fiber optic tray 200a shown in FIG. 14). In some examples, the step 404 includes pivoting multiple fiber optic trays to access a previously inaccessible tray.

Next, the method 400 includes a step 406 of sliding the locking sled 300 from the unlocked position to the locked position. This causes the fiber optic trays 200 to be fixed in place with respect to the cable management system 10 such that the previously inaccessible fiber optic tray is held in an accessible position.

Next, the method 400 may include an optional step 408 of adding or removing an optical fiber to the previously inaccessible fiber optic tray, or making adjustments to an optical fiber on the previously inaccessible fiber optic tray.

FIG. 14 is a front isometric view of the cable management system 10 showing a previously inaccessible fiber optic tray 200a in an accessible position. The previously inaccessible fiber optic tray 200a was previously blocked by fiber optic tray 200b which has been pivoted with respect to the cable management system 10. As shown in FIG. 14, the locking sled 300 is in the locked position such that the fiber optic tray 200a and the fiber optic tray 200b are fixed in their relative positions with respect to the cable management system 10. Thus, the previously inaccessible fiber optic tray 200a is held in a fixed position by the locking sled 300. This can help facilitate the addition or removal of a fiber (not shown) to the previously inaccessible fiber optic tray 200a, or making adjustments to a fiber on the previously inaccessible fiber optic tray 200a.

Referring now to FIGS. 7, 8, 10, and 11, when the polygon shape of the hinges 212 and the locked portions 312 is a hexagon, the fiber optic trays 200 are pivotable with respect to the cable management system 10 by 60 degrees, or by 120 degrees, or by 180 degrees depending on the amount that the hinges 212 are turned inside the unlocked portions 314 of the locking grooves 310. Alternatively, referring now to FIGS. 9 and 12, when the polygon shape of the hinges 213 and the locked portions 313 is a square, the fiber optic trays are pivotable with respect to the cable management system by 90 degrees or by 180 degrees depending on the amount that the hinges 213 are turned inside the unlocked portions of the locking grooves.

Figure 15:
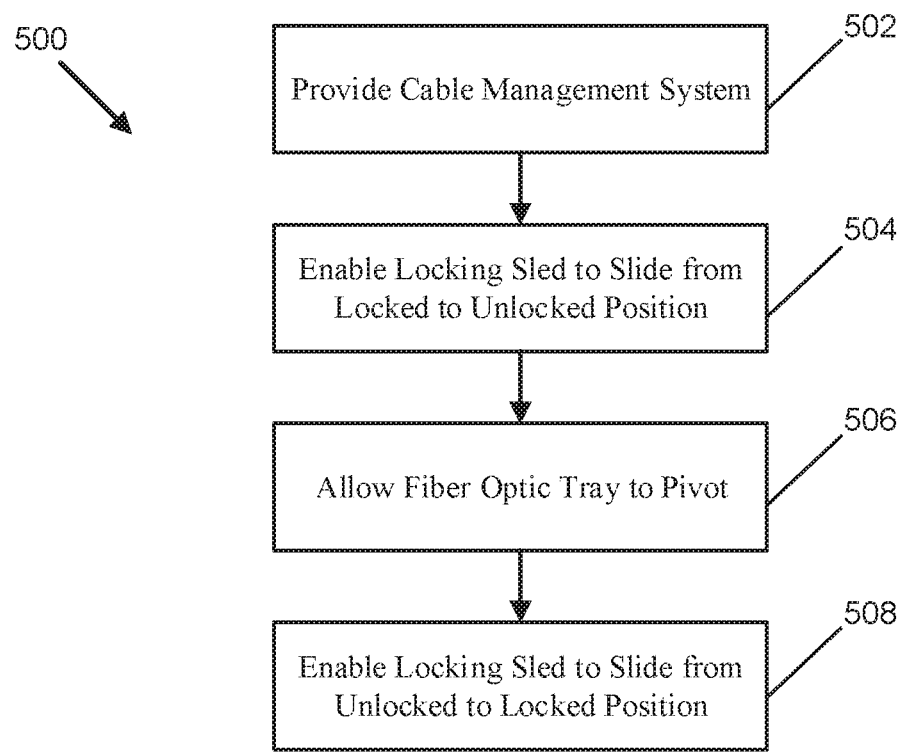
FIG. 15 illustrates another method of operating a cable management system.

FIG. 15 illustrates a method 500 of operating a cable management system. As shown in FIG. 15, the method 500 includes an initial step 502 of providing a cable management system having a locking sled. Next, the method 500 includes a step 504 of enabling the locking sled to slide from a locked position to an unlocked position within the cable management system. Thereafter, the method 500 includes a step 506 of allowing at least one fiber optic tray to pivot with respect to the cable management system for providing access to a previously inaccessible fiber optic tray when the locking sled is in the unlocked position. Next, the method 500 includes a step 508 of enabling the locking sled to slide from the unlocked position to the locked position. When the locking sled is in the locked position, the at least one fiber optic tray is prevented from pivoting with respect to the cable management system.

In some examples, the method 500 can further include enabling the addition or removal of an optical fiber to the previously inaccessible fiber optic tray, or adjustments to an optical fiber on the previously inaccessible fiber optic tray when the locking sled is in the locked position. In some examples, the method 500 further includes enabling a single movement of the locking sled from the locked position to the unlocked position to concurrently pivot a plurality of fiber optic trays simultaneously.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A cable management system comprising:
    a support having a stem and an arm extending from the stem, the arm having a channel with a plurality of openings on opposite sides of the channel;
    a locking sled slidable from a locked position to an unlocked position within the channel, and having a plurality of locking grooves that align with the plurality of openings, each locking groove having a locked portion and an unlocked portion; and
    a plurality of fiber optic trays mounted to the arm, each fiber optic tray having at least one hinge inserted through an opening on the arm and inserted through a locking groove on the locking sled;
    wherein the fiber optic trays are pivotable with respect to the arm when the hinges are in the unlocked portion, and the fiber optic trays are fixed with respect to the arm when the hinges are in the locked portion.

2. The cable management system of claim 1, wherein the locked portion of each locking groove has a polygon shape, and the unlocked portion of each locking groove has an elliptical shape.

3. The cable management system of claim 1, wherein the locked portion of each locking groove has a polygon shape, and the hinge of each fiber optic tray has a corresponding polygon shape.

4. The cable management system of claim 3, wherein the polygon shape is a hexagon, and each fiber optic tray is pivotable with respect to the arm by 60 degrees, by 120 degrees, or by 180 degrees.

5. The cable management system of claim 3, wherein the polygon shape is a square, and each fiber optic tray is pivotable with respect to the arm by 90 degrees or by 180 degrees.

6. The cable management system of claim 1, wherein the arm extends from the stem at about 30 degrees to about 60 degrees.

7. The cable management system of claim 1, wherein a single movement of the locking sled from the locked position to the unlocked position concurrently pivots a plurality of fiber optic trays simultaneously.

8. A telecommunications closure comprising the cable management system of claim 1.

9. A locking sled for use in a cable management system, the locking sled comprising:
    a body configured to slide within the cable management system, the body having at least a first sliding surface and a second sliding surface, the first sliding surface and the second sliding surface being parallel with one another; and
    a first set of locking grooves on the first sliding surface, and a corresponding second set of locking grooves on the second sliding surface, each locking groove having a locked portion and an unlocked portion;

wherein the locked portion prevents a fiber optic tray from pivoting with respect to the cable management system, and the unlocked portion allows the fiber optic tray to pivot with respect to the cable management system.

10. The locking sled of claim 9, wherein the locked portion has a polygon shape, and the unlocked portion has an elliptical shape.

11. The locking sled of claim 9, wherein the locked portion has a hexagon shape, and the locking grooves allow fiber optic trays to pivot with respect to the cable management system by 60 degrees, by 120 degrees, or by 180 degrees.

12. The locking sled of claim 9, wherein the locked portion has a square shape, and the locking grooves allow fiber optic trays to pivot with respect to the cable management system by 90 degrees or 180 degrees.

13. A cable management system for telecommunications closure, the cable management system comprising the locking sled of claim 9.

14. A method of operating a cable management system, the method comprising:

providing a cable management system having a locking sled;

enabling the locking sled to slide from a locked position to an unlocked position within the cable management system;

allowing at least one fiber optic tray to pivot with respect to the cable management system for providing access to a previously inaccessible fiber optic tray when the locking sled is in the unlocked position; and enabling the locking sled to slide from the unlocked position to the locked position, when the locking sled is in the locked position, preventing the at least one fiber optic tray to pivot with respect to the cable management system.

15. The method of claim 14, further comprising:

enabling the addition or removal of an optical fiber to the previously inaccessible fiber optic tray, or adjustments to an optical fiber on the previously inaccessible fiber optic tray when the locking sled is in the locked position.

16. The method of claim 14, further comprising:

enabling a single movement of the locking sled from the locked position to the unlocked position to concurrently pivot a plurality of fiber optic trays simultaneously.

* * * * *

UNITED STATES PATENT AND TRADEMARK OFFICE
CERTIFICATE OF CORRECTION

PATENT NO. : 11,506,853 B2
APPLICATION NO. : 17/259120
DATED : November 22, 2022
INVENTOR(S) : Bart Mattie Claessens et al.

It is certified that error appears in the above-identified patent and that said Letters Patent is hereby corrected as shown below:

In the Claims

Column 9, Line 18, Claim 12: "or 180 degrees." should read --or by 180 degrees.--

Column 9, Line 19, Claim 13: "system for telecommunications" should read --system for a telecommunications--

Signed and Sealed this
Fourteenth Day of March, 2023

Katherine Kelly Vidal
*Director of the United States Patent and Trademark Office*